US009507691B2

(12) United States Patent
Deckert et al.

(10) Patent No.: US 9,507,691 B2
(45) Date of Patent: *Nov. 29, 2016

(54) CONDITIONAL COMPONENT BREAKPOINT SETTING SYSTEM AND METHOD (71) Applicant: International Business Machines Corporation, Armonk, NY (US)

(72) Inventors: Marlin R. Deckert, San Jose, CA (US); Si Bin Fan, Beijing (CN); Jian Jiang, Beijing (CN); De Zhi Mou, Beijing (CN); Fang Wang, Beijing (CN); Jiang Li Wu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 128 days.

This patent is subject to a terminal disclaimer.

(21) Appl. No.: 14/152,053

(22) Filed: Jan. 10, 2014

(65) Prior Publication Data

US 2015/0199258 A1    Jul. 16, 2015

(51) Int. Cl.
G06F 9/44 (2006.01)
G06F 11/36 (2006.01)

(52) U.S. Cl.
CPC .................................. *G06F 11/362* (2013.01)

(58) Field of Classification Search
None
See application file for complete search history.

(56) References Cited

U.S. PATENT DOCUMENTS

| | | | | |
|---|---|---|---|---|
| 6,077,312 | A * | 6/2000 | Bates et al. | 717/129 |
| 6,862,694 | B1 * | 3/2005 | Tormey et al. | 714/34 |
| 7,162,664 | B2 | 1/2007 | Haselden et al. | |
| 7,945,900 | B2 * | 5/2011 | Hsieh | G06F 11/362 717/124 |
| 8,239,838 | B2 * | 8/2012 | Yim et al. | 717/129 |
| 8,806,446 | B2 * | 8/2014 | Kilbane | G06F 11/362 717/129 |
| 2005/0066313 | A1 * | 3/2005 | Bates | G06F 11/3648 717/129 |
| 2005/0066314 | A1 * | 3/2005 | Bates | G06F 11/3644 717/129 |
| 2007/0240123 | A1 * | 10/2007 | Bustelo | G06F 11/362 717/129 |
| 2008/0235668 | A1 * | 9/2008 | Browning | G06F 11/3644 717/129 |
| 2010/0169867 | A1 * | 7/2010 | Wegmann | 717/129 |
| 2010/0287562 | A1 * | 11/2010 | Jazdzewski | 719/313 |
| 2012/0110555 | A1 * | 5/2012 | Bates | G06F 11/362 717/129 |
| 2012/0246624 | A1 | 9/2012 | Halliday et al. | |
| 2013/0097588 | A1 * | 4/2013 | Bates | 717/124 |
| 2013/0117732 | A1 | 5/2013 | Zoller et al. | |
| 2014/0344790 | A1 * | 11/2014 | Bates | G06F 11/3636 717/129 |

OTHER PUBLICATIONS

Zhang et al., "BPGen: An Automated Breakpoint Generator for Debugging," ICSE '10, May 2-8, 2010, IEEE, http://ieeexplore.ieee.org/xpl/articleDetails.jsp?tp=tp=&arnumber=6062177&searchWithin%3DDegbugger%26sortType%3Ddesc_p_Publication_Year%26queryText%3DBreakpoints; pp. 271-274.

* cited by examiner

*Primary Examiner* — Isaac T Tecklu
(74) *Attorney, Agent, or Firm* — Brian J. Colandreo, Esq.; Jeffrey T. Placker, Esq.; Holland & Knight LLP (57) ABSTRACT

A method, computer program product, and computer system for setting, at a computing device, a breakpoint of a plurality of breakpoints for use by a debugger at an entry point of a plurality of entry points for a component of a plurality of components, wherein the breakpoint is set automatically. While executing the debugger on the component, it is determined whether the breakpoint is reached from outside of the component by a program. If the breakpoint is reached from outside of the component, the program executed by the debugger stops. If the breakpoint is reached from inside of the component, the program executed by the debugger continues.

13 Claims, 10 Drawing Sheets

CONDITIONAL COMPONENT BREAKPOINT SETTING SYSTEM AND METHOD

BACKGROUND

When writing code for, e.g., an application, a debugging application may be used to determine any errors that may exist in the application that may cause the application not to execute properly. Debugger applications may use multiple types of "breakpoints" to aid in the debugging process.

BRIEF SUMMARY OF DISCLOSURE

In one implementation, a method, performed by one or more computing devices, may include but is not limited to setting, at a computing device, a breakpoint of a plurality of breakpoints for use by a debugger at an entry point of a plurality of entry points for a component of a plurality of components, wherein the breakpoint may be set automatically. While executing the debugger on the component, it may be determined whether the breakpoint is reached from outside of the component by a program. If the breakpoint is reached from outside of the component, the program executed by the debugger may stop. If the breakpoint is reached from inside of the component, the program executed by the debugger may continue.

One or more of the following features may be included. It may be determined that the debugger has left the component, and in response, the program executed by the debugger may stop. The plurality of breakpoints may be at least one of enabled and disabled. Individual breakpoints of the plurality of breakpoints may be at least one of enabled and disabled. The breakpoint may be marked as a breakpoint of the component to distinguish from a normal breakpoint. The component may include a set of source code. Determining whether the breakpoint is reached from outside of the component may include checking a call stack.

In another implementation, a computing system includes a processor and a memory configured to perform operations that may include but are not limited to setting a breakpoint of a plurality of breakpoints for use by a debugger at an entry point of a plurality of entry points for a component of a plurality of components, wherein the breakpoint may be set automatically. While executing the debugger on the component, it may be determined whether the breakpoint is reached from outside of the component by a program. If the breakpoint is reached from outside of the component, the program executed by the debugger may stop. If the breakpoint is reached from inside of the component, the program executed by the debugger may continue.

One or more of the following features may be included. It may be determined that the debugger has left the component, and in response, the program executed by the debugger may stop. The plurality of breakpoints may be at least one of enabled and disabled. Individual breakpoints of the plurality of breakpoints may be at least one of enabled and disabled. The breakpoint may be marked as a breakpoint of the component to distinguish from a normal breakpoint. The component may include a set of source code. Determining whether the breakpoint is reached from outside of the component may include checking a call stack.

In another implementation, a computer program product resides on a computer readable storage medium that has a plurality of instructions stored on it. When executed by a processor, the instructions cause the processor to perform operations that may include but are not limited to setting a breakpoint of a plurality of breakpoints for use by a debugger at an entry point of a plurality of entry points for a component of a plurality of components, wherein the breakpoint may be set automatically. While executing the debugger on the component, it may be determined whether the breakpoint is reached from outside of the component by a program. If the breakpoint is reached from outside of the component, the program executed by the debugger may stop. If the breakpoint is reached from inside of the component, the program executed by the debugger may continue.

One or more of the following features may be included. It may be determined that the debugger has left the component, and in response, the program executed by the debugger may stop. The plurality of breakpoints may be at least one of enabled and disabled. Individual breakpoints of the plurality of breakpoints may be at least one of enabled and disabled. The breakpoint may be marked as a breakpoint of the component to distinguish from a normal breakpoint. The component may include a set of source code. Determining whether the breakpoint is reached from outside of the component may include checking a call stack.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

System Overview:

As will be appreciated by one skilled in the art, the present disclosure may be embodied as a method, system, or computer program product. Accordingly, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer readable medium may be a computer readable signal medium or a computer readable storage medium. The computer-usable, or computer-readable, storage medium (including a storage device associated with a computing device or client electronic device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of this document, a computer-usable or computer-readable, storage medium may be any tangible medium that can contain or store a program for use by or in connection with the instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. The computer readable program code may be transmitted using any appropriate medium, including but not limited to the internet, wireline, optical fiber cable, RF, etc. A computer readable signal medium may be any computer readable medium that is not a computer readable storage medium and that can communicate, propagate, or transport a program for use by or in connection with an instruction execution system, apparatus, or device.

Computer program code for carrying out operations of the present disclosure may be written in an object oriented programming language such as Java®, Smalltalk, C++ or the like. Java and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as Javascript or PERL. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider).

The flowchart and block diagrams in the figures illustrate the architecture, functionality, and operation of possible implementations of apparatus (systems), methods and computer program products according to various implementations of the present disclosure. It will be understood that each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some alternative implementations, the functions noted in the block(s) may occur out of the order noted in the figures. For example, two blocks shown in succession may, in fact, be executed substantially concurrently, or the blocks may sometimes be executed in the reverse order, depending upon the functionality involved.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

The computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Figure 1:
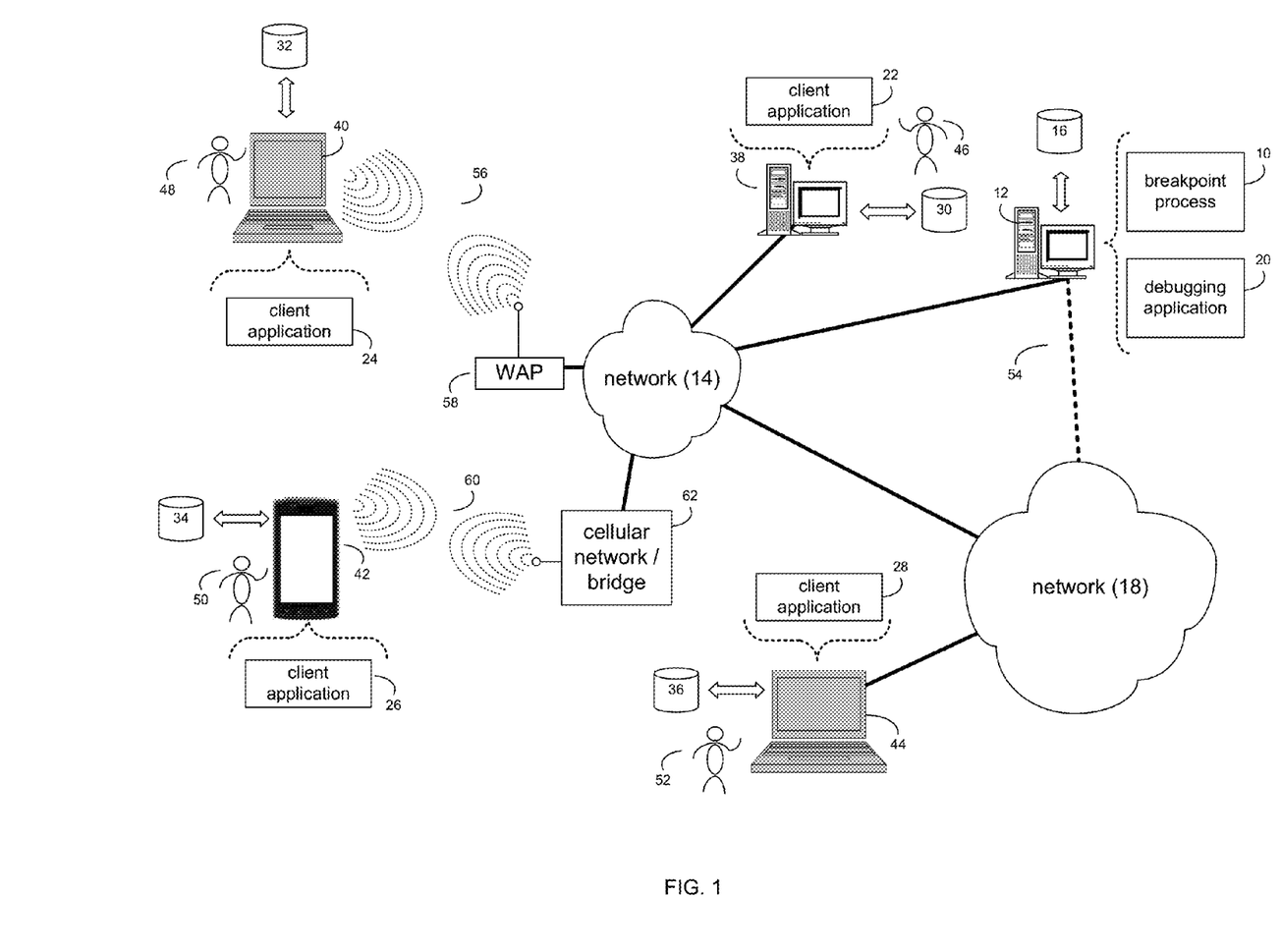
FIG. 1 is an illustrative diagrammatic view of a breakpoint process coupled to a distributed computing network according to one or more implementations of the present disclosure.

Referring to FIG. 1, there is shown breakpoint process 10 that may reside on and may be executed by a computer (e.g., computer 12), which may be connected to a network (e.g., network 14) (e.g., the internet or a local area network). Examples of computer 12 (and/or one or more of the client electronic devices noted below) may include, but are not limited to, a personal computer(s), a laptop computer(s), mobile computing device(s), a server computer, a series of server computers, a mainframe computer(s), or a computing cloud(s). Computer 12 may execute an operating system, for example, but not limited to, Microsoft® Windows®; Mac® OS X®; Red Hat® Linux®, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

As will be discussed below in greater detail, breakpoint process 10 may set, at a computing device, a breakpoint of a plurality of breakpoints for use by a debugger at an entry point of a plurality of entry points for a component of a plurality of components, wherein the breakpoint may be set automatically. While executing the debugger on the component, it may be determined whether the breakpoint is reached from outside of the component by a program. If the breakpoint is reached from outside of the component, the program executed by the debugger may stop. If the breakpoint is reached from inside of the component, the program executed by the debugger may continue.

The instruction sets and subroutines of breakpoint process 10, which may be stored on storage device 16 coupled to computer 12, may be executed by one or more processors (not shown) and one or more memory architectures (not shown) included within computer 12. Storage device 16 may include but is not limited to: a hard disk drive; a flash drive, a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

Computer 12 may include a data store, such as a database (e.g., relational database, object-oriented database, triple-store database, etc.) and may be located within any suitable memory location, such as storage device 16 coupled to computer 12. Any data described throughout the present disclosure may be stored in the data store. In some implementations, computer 12 may utilize a database management system such as, but not limited to, "My Structured Query Language" (MySQL®), DB2, etc. in order to provide multi-user access to one or more databases, such as the above noted relational database. The data store may also be a custom database, such as, for example, a flat file database or an XML database. Any other form(s) of a data storage structure and/or organization may also be used. Breakpoint process 10 may be a component of the data store, a stand alone application that interfaces with the above noted data store and/or an applet/application that is accessed via client applications 22, 24, 26, 28. The above noted data store may be, in whole or in part, distributed in a cloud computing topology. In this way, computer 12 and storage device 16 may refer to multiple devices, which may also be distributed throughout the network.

Computer 12 may execute a debugging application (e.g., debugging application 20), examples of which may include, but are not limited to, e.g., a static code analyzer application, an interactive debugging application, a control flow application, an integration testing application, a file logging application, a monitoring (e.g., application, system, etc.) application, a memory dump application, a profiling application, a statistical process control application, or other application that allows for the finding and reduction of the number of bugs, or defects, in a computer program application and/or a piece of electronic hardware. Breakpoint process 10 and/or debugging application 20 may be accessed via client applications 22, 24, 26, 28. Breakpoint process 10 may be a stand alone application, or may be an applet/application/script/extension that may interact with and/or be executed within debugging application 20, a component of debugging application 20, and/or one or more of client applications 22, 24, 26, 28. Debugging application 20 may be a stand alone application, or may be an applet/application/script/extension that may interact with and/or be executed within breakpoint process 10, a component of breakpoint process 10, and/or one or more of client applications 22, 24, 26, 28. One or more of client applications 22, 24, 26, 28 may be a stand alone application, or may be an applet/application/script/extension that may interact with and/or be executed within and/or be a component of breakpoint process 10 and/or debugging application 20. Examples of client applications 22, 24, 26, 28 may include, but are not limited to, e.g., a static code analyzer application, an interactive debugging application, a control flow application, an integration testing application, a file logging application, a monitoring (e.g., application, system, etc.) application, a memory dump application, a profiling application, a statistical process control application, or other application that allows for the finding and reduction of the number of bugs, or defects, in a computer program application and/or a piece of electronic hardware, a standard and/or mobile web browser, an email client application, a textual and/or a graphical user interface, a customized web browser, a plugin, an Application Programming Interface (API), or a custom application. The instruction sets and subroutines of client applications 22, 24, 26, 28, which may be stored on storage devices 30, 32, 34, 36, coupled to client electronic devices 38, 40, 42, 44, may be executed by one or more processors (not shown) and one or more memory architectures (not shown) incorporated into client electronic devices 38, 40, 42, 44.

Storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet (not shown), a server (not shown), a television (not shown), a smart television (not shown), a media (e.g., video, photo, etc.) capturing device (not shown), and a dedicated network device (not shown). Client electronic devices 38, 40, 42, 44 may each execute an operating system, examples of which may include but are not limited to, Android™, Apple® iOS®, Mac® OS X®; Red Hat® Linux®, or a custom operating system.

One or more of client applications 22, 24, 26, 28 may be configured to effectuate some or all of the functionality of breakpoint process 10 (and vice versa). Accordingly, breakpoint process 10 may be a purely server-side application, a purely client-side application, or a hybrid server-side/client-side application that is cooperatively executed by one or more of client applications 22, 24, 26, 28 and/or breakpoint process 10.

One or more of client applications 22, 24, 26, 28 may be configured to effectuate some or all of the functionality of debugging application 20 (and vice versa). Accordingly, debugging application 20 may be a purely server-side application, a purely client-side application, or a hybrid server-side/client-side application that is cooperatively executed by one or more of client applications 22, 24, 26, 28 and/or debugging application 20. As one or more of client applications 22, 24, 26, 28, breakpoint process 10, and debugging application 20, taken singly or in any combination, may effectuate some or all of the same functionality, any description of effectuating such functionality via one or more of client applications 22, 24, 26, 28, breakpoint process 10, debugging application 20, or combination thereof, and any described interaction(s) between one or more of client applications 22, 24, 26, 28, breakpoint process 10, debugging application 20, or combination thereof to effectuate such functionality, should be taken as an example only and not to limit the scope of the disclosure.

Users 46, 48, 50, 52 may access computer 12 and breakpoint process 10 (e.g., using one or more of client electronic devices 38, 40, 42, 44) directly through network 14 or through secondary network 18. Further, computer 12 may be connected to network 14 through secondary network 18, as illustrated with phantom link line 54. Breakpoint process 10 may include one or more user interfaces, such as browsers and textual or graphical user interfaces, through which users 46, 48, 50, 52 may access breakpoint process 10.

The various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, Wi-Fi®, and/or Bluetooth™ device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown directly coupled to network 14.

Some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

Figure 2:
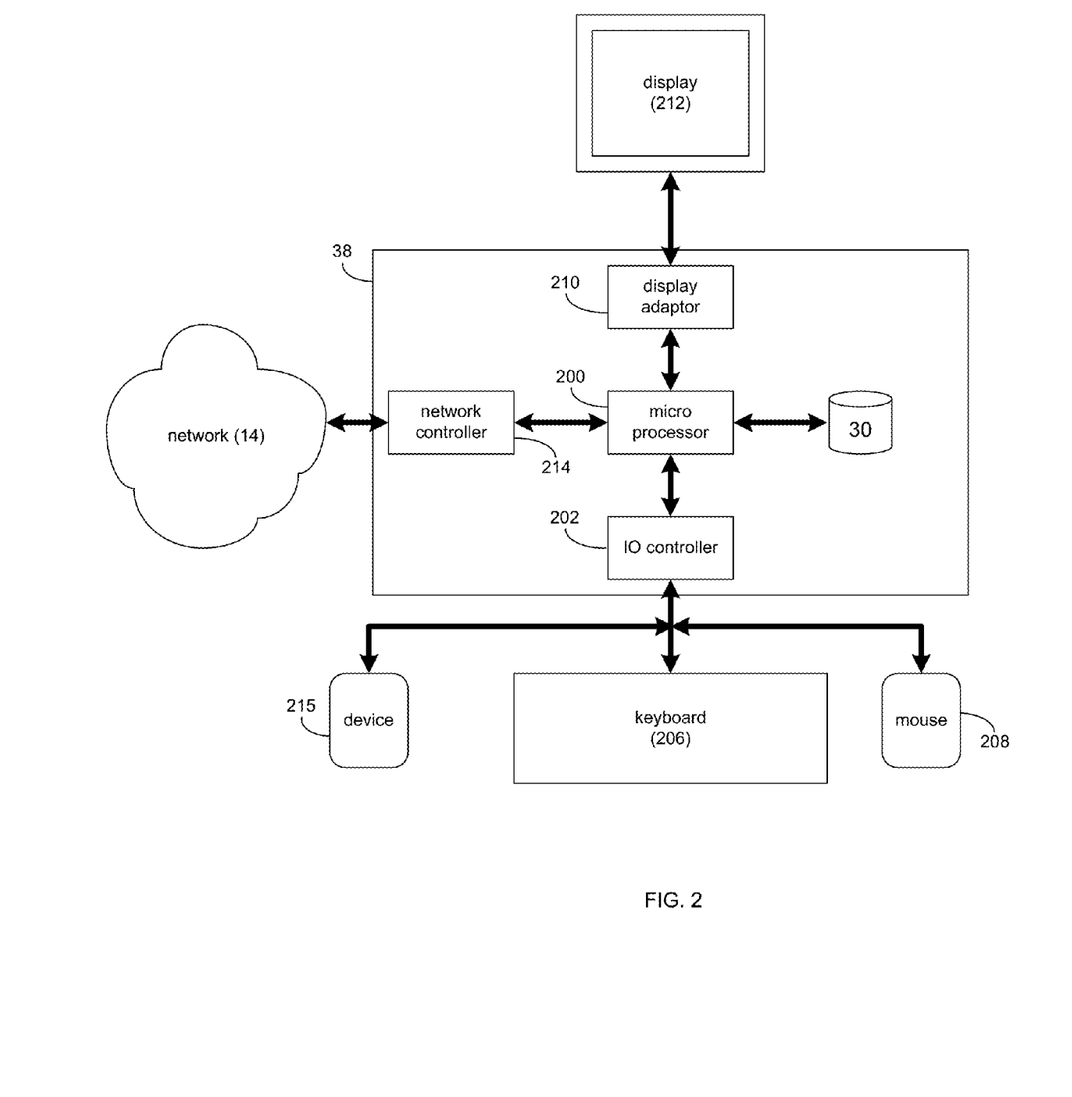
FIG. 2 is a diagrammatic view of a client electronic device of FIG. 1 according to one or more implementations of the present disclosure.
Figure 3:
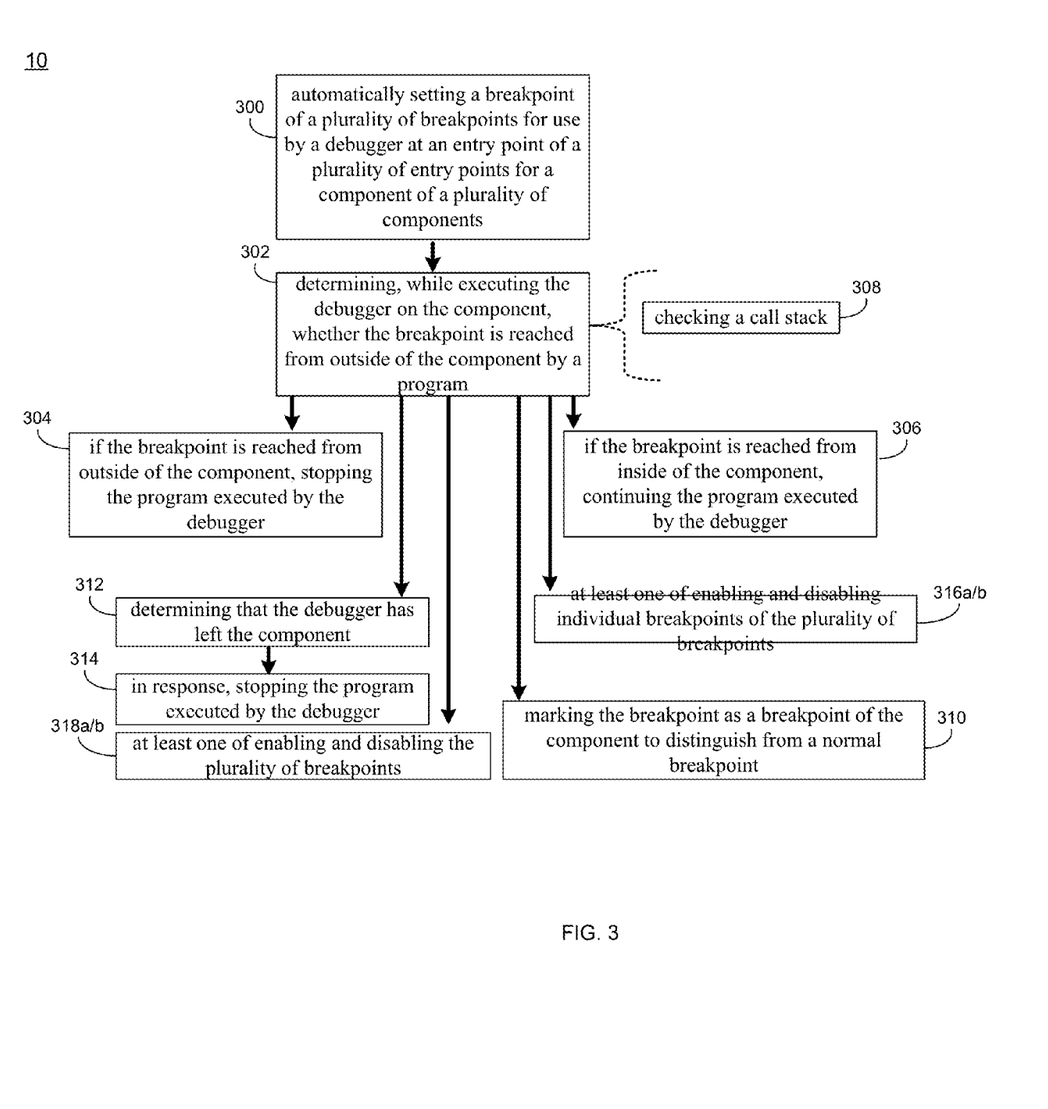
FIG. 3 is an illustrative flowchart of the breakpoint process of FIG. 1 according to one or more implementations of the present disclosure.

Referring also to FIG. 2, there is shown a diagrammatic view of client electronic device 38. While client electronic device 38 is shown in this figure, this is for illustrative purposes only and is not intended to be a limitation of this disclosure, as other configurations are possible. For example, any computing device capable of executing, in whole or in part, breakpoint process 10 may be substituted for client electronic device 38 within FIG. 2, examples of which may include but are not limited to computer 12 and/or client electronic devices 40, 42, 44.

Client electronic device 38 may include a processor and/or microprocessor (e.g., microprocessor 200) configured to, e.g., process data and execute the above-noted code/instruction sets and subroutines. Microprocessor 200 may be coupled via a storage adaptor (not shown) to the above-noted storage device(s) (e.g., storage device 30). An I/O controller (e.g., I/O controller 202) may be configured to couple microprocessor 200 with various devices, such as keyboard 206, pointing/selecting device (e.g., mouse 208), custom device (e.g., device 215), USB ports (not shown), and printer ports (not shown). A display adaptor (e.g., display adaptor 210) may be configured to couple display 212 (e.g., CRT or LCD monitor(s)) with microprocessor 200, while network controller/adaptor 214 (e.g., an Ethernet adaptor) may be configured to couple microprocessor 200 to the above-noted network 14 (e.g., the Internet or a local area network).

The Breakpoint Process:

As discussed above and referring also to FIGS. 3-10, breakpoint process 10 may set 300 a breakpoint of a plurality of breakpoints for use by a debugger at an entry point of a plurality of entry points for a component of a plurality of components, wherein the breakpoint may be set 300 automatically. While executing the debugger on the component, breakpoint process 10 may determine 302 whether the breakpoint is reached from outside of the component by a program. If the breakpoint is reached from outside of the component, breakpoint process 10 may stop 304 the program executed by the debugger. If the breakpoint is reached from inside of the component, breakpoint process 10 may continue 306 the program executed by the debugger.

When debugging, e.g., a program application, example types of breakpoints used by, e.g., debugging application 20, may include but are not limited to, a line breakpoint, a conditional breakpoint, a function breakpoint, etc. Such example breakpoints may not be as useful for debugging issues "cross components", (e.g., at least for granularity reasons), such as the following example scenarios where the user may need to guess where the most likely place to set a breakpoint is, and may try one by one:

Scenario 1: One cross component issue is reported. For example, the issue is reported for component A. But owner of component A said that this issue is caused by downstream component B. Owner of component B starts to investigate this issue by debugging, and owner of component B wants the debugger to stop the program being executed whenever the program runs into component B and leaves component B.

Scenario 2: The user may not know where to set a break point to debug a product issue. For example, one product issue may be reported. The product may be complex, and the developer who is working on this issue may not be very familiar with the product. The developer may have little to no idea where s/he should set the break point to start to debug this issue.

Scenario 3: The product may consist of many components. For example, assume a user is learning a product by debugging it. It may be useful if the user can see clearly when the debugger moves from one component to another.

However, rather than, e.g., having the user guess where the most likely place to set a breakpoint is, and try each one by one, in some implementations, breakpoint process 10 may allow a breakpoint to be set at the component level. For instance, in some implementations, breakpoint process 10 may automatically set 300 a breakpoint of a plurality of breakpoints for use by a debugger at an entry point of a plurality of entry points for a component of a plurality of components. For example, and referring at least to FIG. 4, an example component 400 to be debugged with, e.g., four entry points A (402a), B (402b), C (402c), and D (402d) may be identified by breakpoint process 10 and/or debugging application 20. A component entry point may be where an external program (e.g., via debugging application 20) may call into component 400. In some implementations, entry points may be identified by, e.g., impact analysis/static analysis, e.g., to check methods of how the components are called by the external program, finding exported symbols in a shared library, and/or inspecting an abstract syntax tree to find program elements (e.g., public methods, exported functions, API definitions, etc.).

A breakpoint for component 400 may generally be described as including, e.g., one or more line breakpoints at the entry points of component 400. For example, and referring at least to FIG. 5, component 400 is shown with line breakpoint 500 of component entry point 402a. In the example, breakpoint process 10 may set 300 for component 400 the breakpoint (e.g., line breakpoint 500) for entry point 402a, set 300 another breakpoint for entry point 402b, set 300 another breakpoint for entry point 402c, and set 300 another breakpoint for entry point 402d. As will be discussed in greater detail below, when the debugger enters component 400 via crossing the line breakpoint boundary (and when the particular breakpoint and/or component 400 is enabled), the program executed by the debugger may stop. As will also be discussed in greater detail below, when the line breakpoint moves to another line breakpoint from within the same component 400, the new line breakpoint may not stop and may continue debugging the program. While four entry points are shown, it will be appreciated that more or less entry points may be used without departing from the scope of this disclosure.

Figure 5:
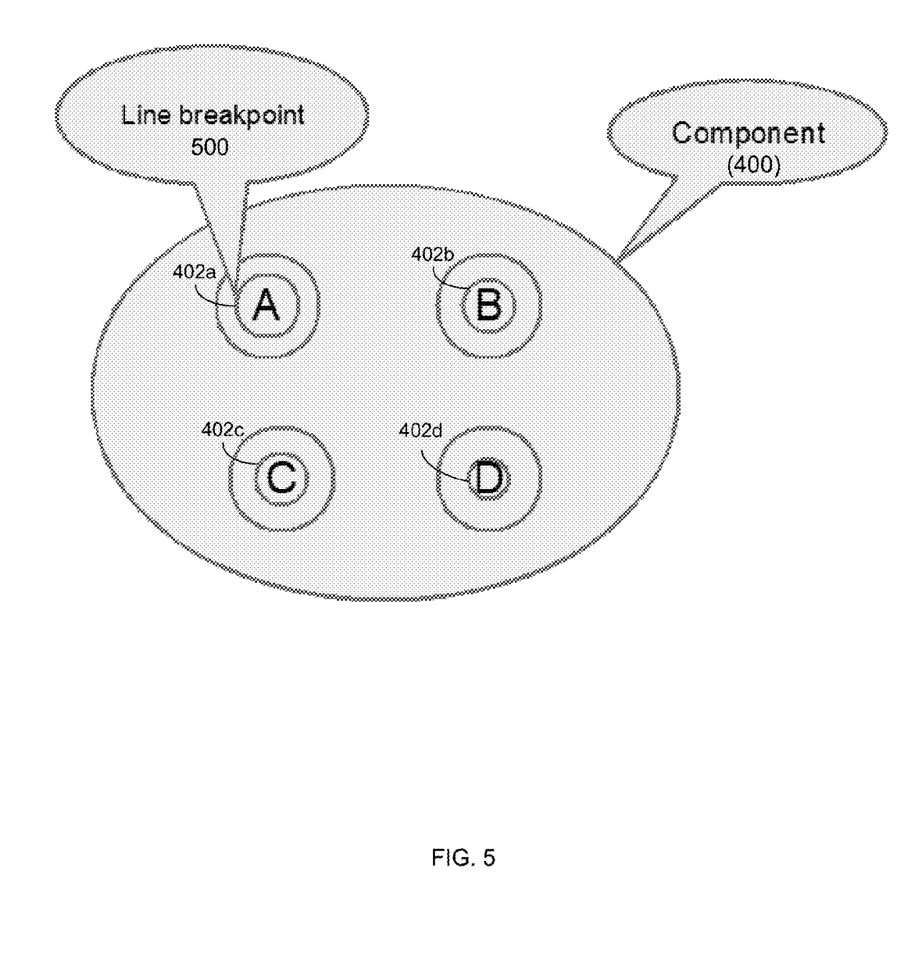
FIG. 5 is an illustrative diagrammatic view of a component according to one or more implementations of the present disclosure.

In some implementations, component 400 may include a set of source code. For instance, the set of source code (e.g., packages, extension points, a list of source codes, etc.) may implement a function associated with the application being debugged by debugging application 20 that a developer may be interested in.

Figure 4:
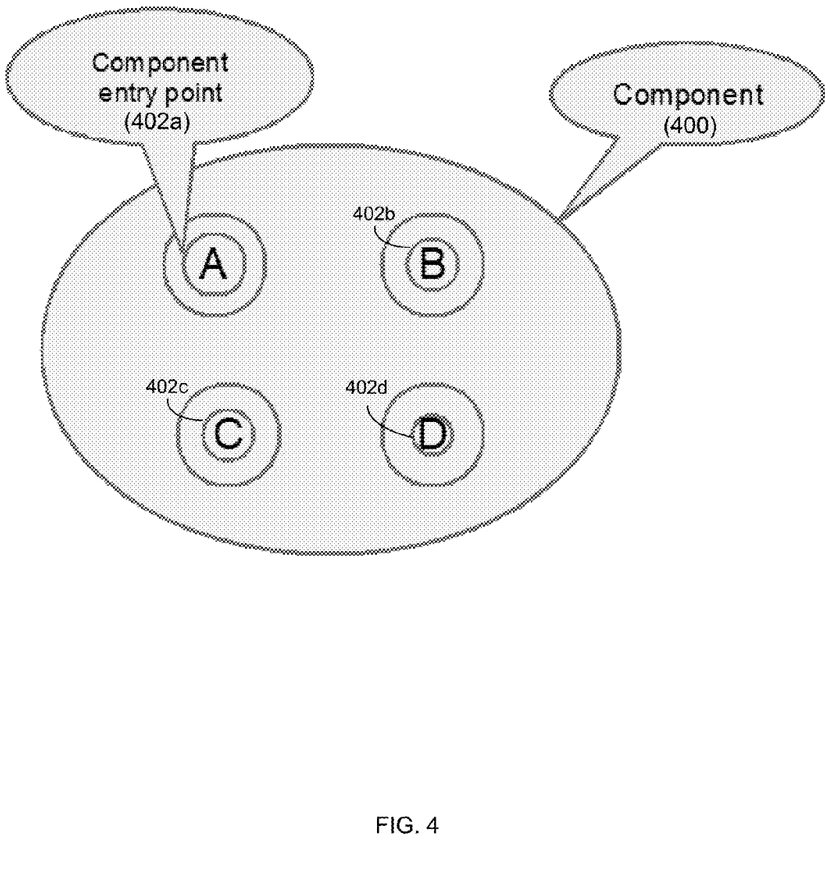
FIG. 4 is an illustrative diagrammatic view of a component according to one or more implementations of the present disclosure.

In some implementations, a user (e.g., user 46) may define/select component 400. For example, breakpoint process 10 and/or debugging application 20 may include a user interface (not shown), which may enable user 46 to use one or more definitions of component 400 to identify the candidate source code. This may include, e.g., at least a portion of all the source files of a particular directory, at least a portion of all the files that may be linked together into a shared library, a set of shared libraries, etc. In some implementations, user 46 may be enabled to use one or more definitions of component 400 to identify the candidate source code, which may be done at the package and/or class level and/or other construct, as may be appropriate for the programming language being used. In some implementations, user 46 may be enabled to use one or more definitions of component 400 to identify the candidate source code, which may include user 46 identifying a section of source code in one file or several files and calling that component for the current debugging session.

While executing the debugger on the program, breakpoint process 10 may determine 302 whether breakpoint 500 is reached from outside of component 400 by a program. For instance, and referring at least to FIG. 6, assume for example purposes only that during the debugging process, external program 600 (E) makes a call into component 400 and reaches line breakpoint 500 for component entry point 402a (A), and the program executed by the debugger stops at component entry point 402a (A), i.e., line breakpoint 500 is "hit" or reached. In the example, the line breakpoint is set at Statement F next to E. This breakpoint may be the "component exit breakpoint".

Figure 6:
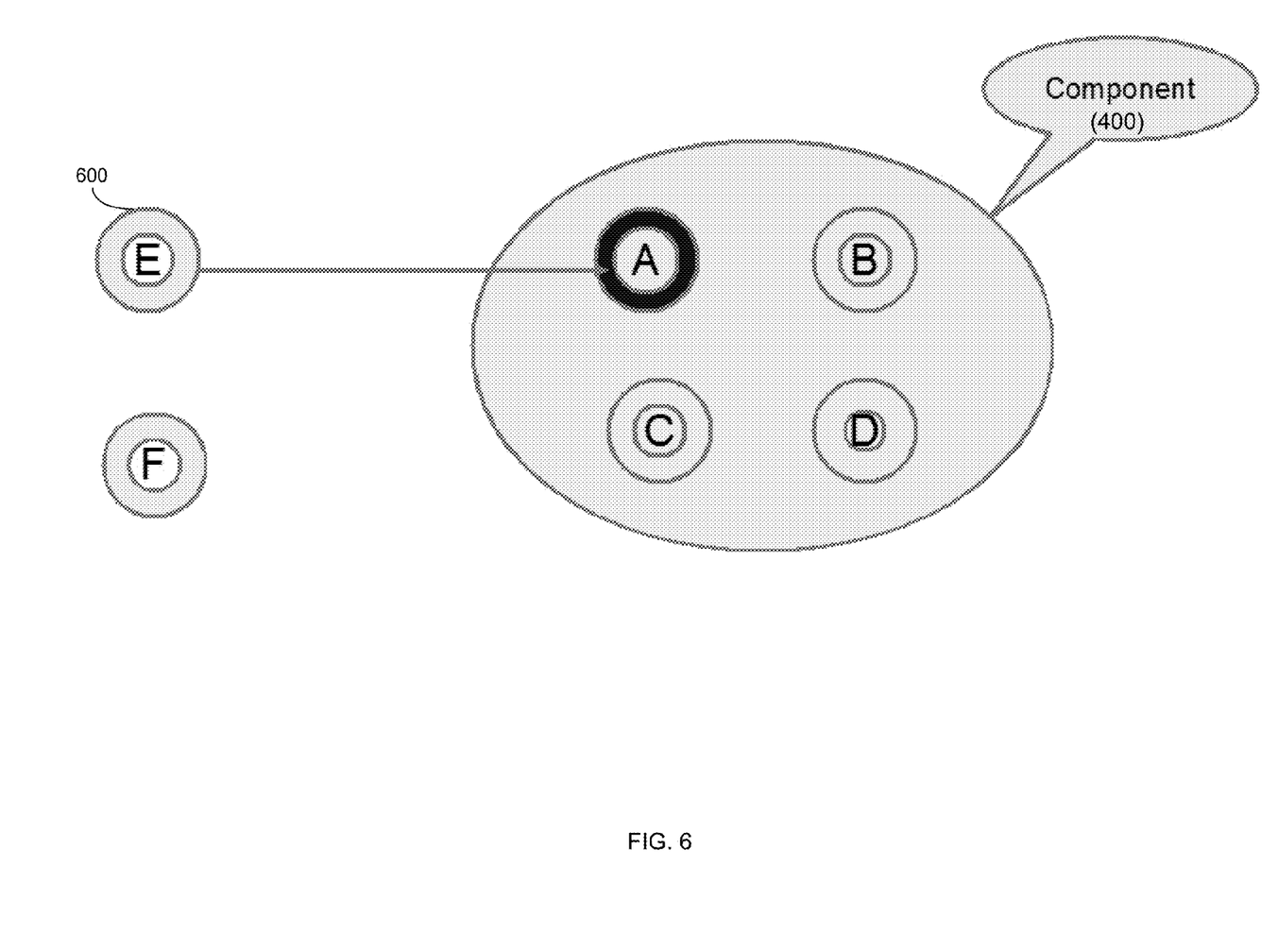
FIG. 6 is an illustrative diagrammatic view of a component according to one or more implementations of the present disclosure.
Figure 7:
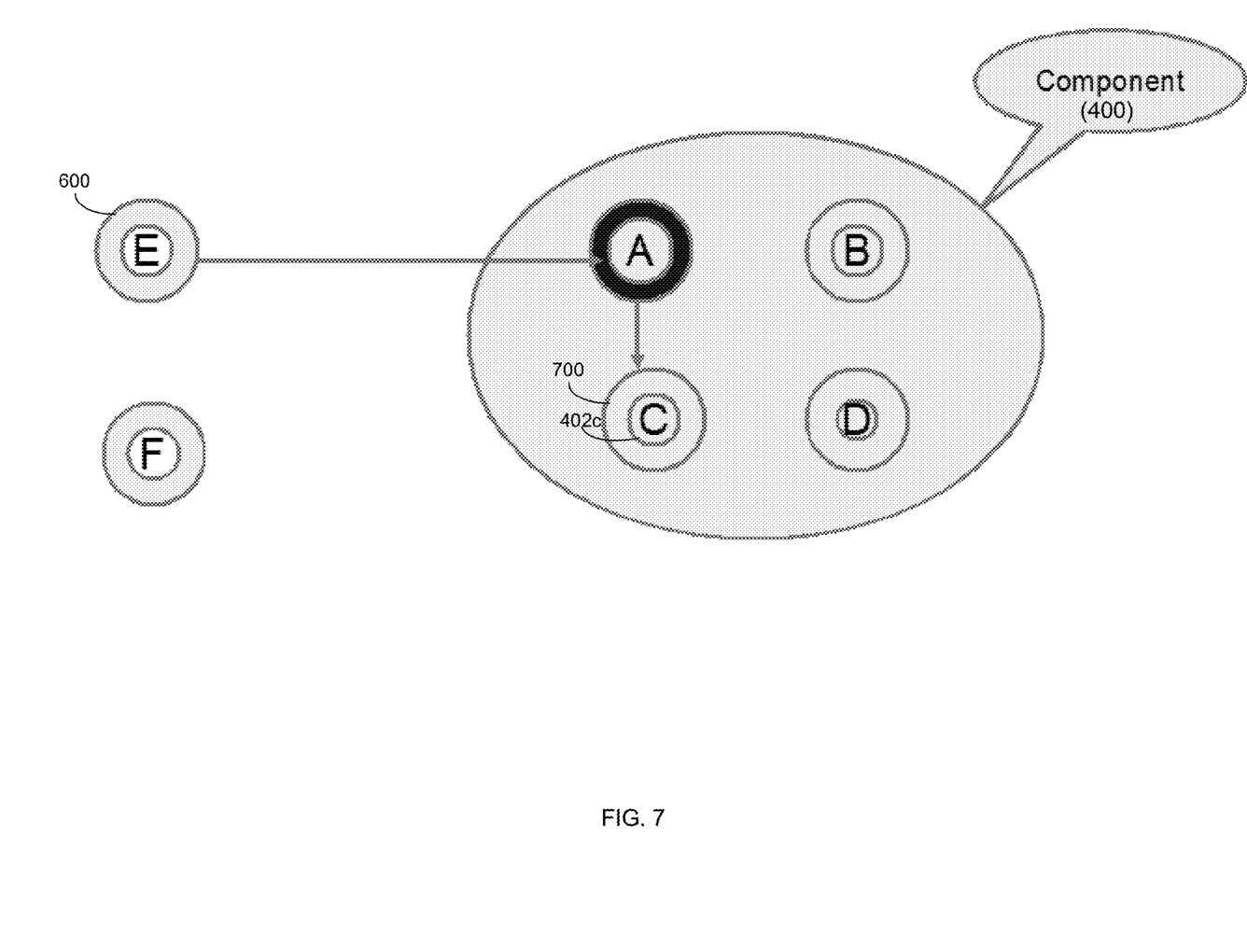
FIG. 7 is an illustrative diagrammatic view of a component according to one or more implementations of the present disclosure.
Figure 8:
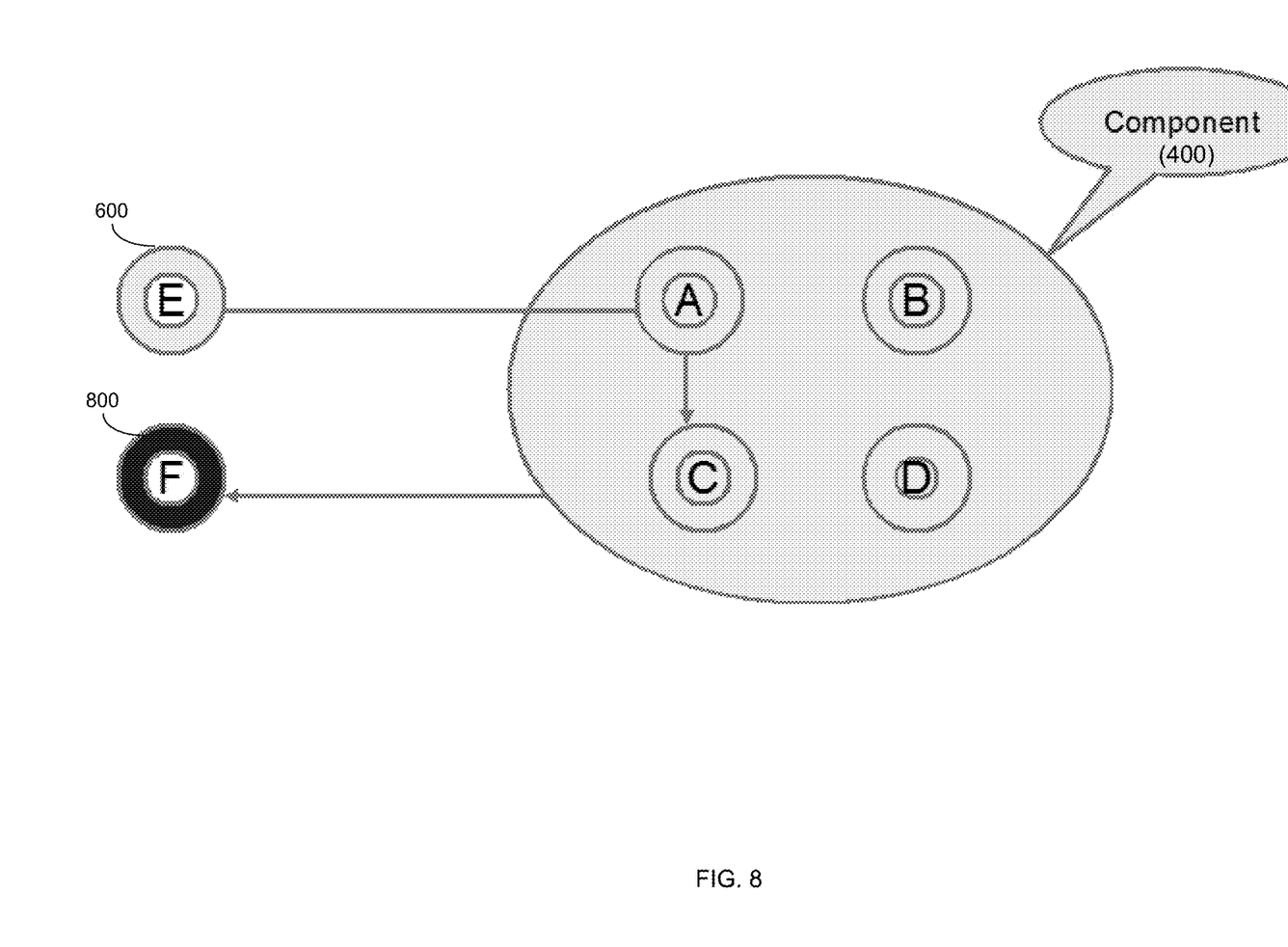
FIG. 8 is an illustrative diagrammatic view of a component according to one or more implementations of the present disclosure.

In some implementations, as noted above, determining 302 whether the breakpoint is reached from outside of the component by a program may include breakpoint process 10 checking 308 a call stack. As noted above, this may be accomplished by, e.g., breakpoint process 10 performing a run time check on the call stack to identify the call made by external program 600 (E) into component 400.

In some implementations, breakpoint process 10 may mark 310 the breakpoint (e.g., line breakpoint 500) as a breakpoint of the component to distinguish from a normal breakpoint. For instance, as noted above, there may be numerous types of breakpoints, and to determine 302 whether the breakpoint that is reached is from outside of the component by a program, breakpoint process 10 may mark 310 the breakpoint as a breakpoint as a breakpoint of the component to distinguish from a normal breakpoint by, e.g., adding a property (e.g., flag) for the entry line breakpoints to distinguish them from other types of line breakpoints (e.g., normal breakpoints).

In some implementations, if the breakpoint is reached from outside of the component, breakpoint process 10 may stop 304 the program executed by the debugger. For instance, and referring still at least to FIG. 6, external program 600 (E) makes a call into component 400 and reaches line breakpoint 500 for component entry point 402a (A), i.e., line breakpoint 500 is "hit" or reached. As line breakpoint 500 for component entry point 402a (A) has been reached from outside of component 400 (e.g., via external program 600 (E)), line breakpoint 500 may be triggered by the call and breakpoint process 10 may stop 304 the program executed by the debugger. That is, in the example, breakpoint process 10 may stop 304 the debugger when returning to code outside of component 400. In some implementations, breakpoint process 10 via the debugger may automatically set a "step-out" breakpoint when a component entry point breakpoint is taken. A step-out breakpoint may be similar to a step-over breakpoint. For step-over, the debugger may set a breakpoint on the statement after the one about to be executed. For step-out, the debugger may set a breakpoint after the current component (e.g., function), which may be on the next statement to be executed after the function returns. That may be in the calling function from outside the component, on the statement immediately after the call to the current function inside the component. The debugger may implement a step-out breakpoint by, e.g., checking 308 the call stack, looking at frame 2 (where frame 1 is for the current function) to determine where the call originated. Once the program executed by the debugger has stopped 304, user 46 may via breakpoint process 10, start to debug from that point.

In some implementations, if the breakpoint is reached from inside of the component, breakpoint process 10 may continue 306 the program executed by the debugger. For instance, and referring at least to FIG. 7, assume for example purposes only that a call is made from entry point 402a (A) and reaches line breakpoint 700 for component entry point 402c (C), i.e., line breakpoint 700 is "hit" or reached. As line breakpoint 700 for component entry point 402c (C) has been reached from a call within component 400 (e.g., via a "within component call" made from entry point 402a (A), which is within component 400), line breakpoint 700 may not be triggered by the call and breakpoint process 10 may continue 306 the program executed by the debugger. That is, in the example, the program executed by the debugger may be stopped 304 at any component breakpoint within component 400 only when the call comes from outside component 400, otherwise the program executed by the debugger may continue 306. As noted above, this may be determined at run time by checking 308 the call stack to see whether the caller is outside of component 400.

In some implementations, breakpoint process 10 may determine 312 that the debugger has left the component, and in response, breakpoint process 10 may stop 314 the program executed by the debugger. For example, and referring at least to FIG. 8, breakpoint process 10 may determine 312 that component 400 (e.g., via breakpoint process 10) returns to statement 800 (F), which in the example is "next to" external program 600 (E). In the example, breakpoint process 10 may determine 312 that the debugger has left component 400, and in response, stop 314 the program executed by the debugger at statement 800 (F) (e.g., indicating the debugger is out of component 400).

In some implementations, breakpoint process 10 may at least one of enable 316a and disable 316b individual breakpoints of the plurality of breakpoints. For example, and referring at least to FIG. 9, an example user interface 900 associated with breakpoint process 10 and/or debugging application 20 is shown. In the example, user interface 900 (e.g., via breakpoint process 10) may enable user 46 to select individual breakpoints within component 400 to enable 316a (e.g., be included) as one of the breakpoints and/or to disable 316b (e.g., be excluded) as one of the breakpoints.

For instance, object 902 may be a component breakpoint for selected components to debug, where the breakpoints above 902 may be normal breakpoints. Assume that user 46 selects object 902 to enable 316a component entry point 402a (A). Just as discussed in the above example, when external program 600 (E) makes a call into component 400 and reaches line breakpoint 500 for component entry point 402a (A), i.e., line breakpoint 500 is "hit" or reached. As line breakpoint 500 for component entry point 402a (A) has been reached from outside of component 400 (e.g., via external program 600 (E)), line breakpoint 500 may be triggered by the call and breakpoint process 10 may stop 304 the program executed by the debugger. However, now assume that user 46 deselects (or does not initially select) object 902 to disable 316b component entry point 402a (A). In the example, even though line breakpoint 500 for component entry point 402a (A) has been reached from outside of component 400 (e.g., via external program 600 (E)), line breakpoint 500 may not be triggered by the call and breakpoint process 10 may continue 306 the program executed by the debugger, since component entry point 402a (A) is disabled 316b. It will be appreciated that any of the above-noted component entry points in FIG. 9, including component entry point 402d (not shown), may be enabled 316a and/or disabled 316b individually and/or simultaneously.

Figure 9:
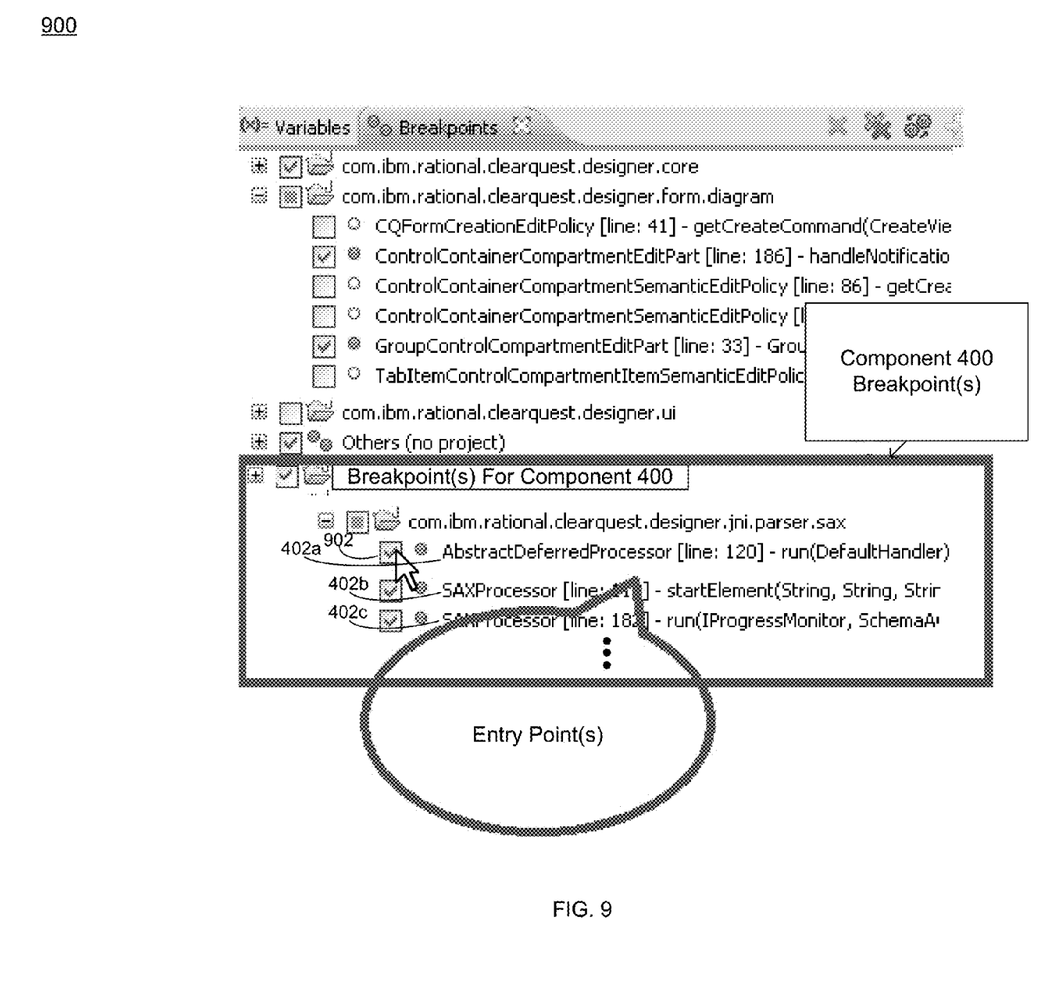
FIG. 9 is an illustrative diagrammatic view of a screen image displayed by the breakpoint process of FIG. 1 according to one or more implementations of the present disclosure.

In some implementations, breakpoint process 10 may at least one of enable 318a and disable 318b the plurality of breakpoints. For instance, similarly as noted above, user interface 900 (e.g., via breakpoint process 10) may enable user 46 to select all of the plurality of breakpoints within component 400 to enable 318a (e.g., be included) as a component and/or to disable 318b (e.g., be excluded) as a component.

Figure 10:
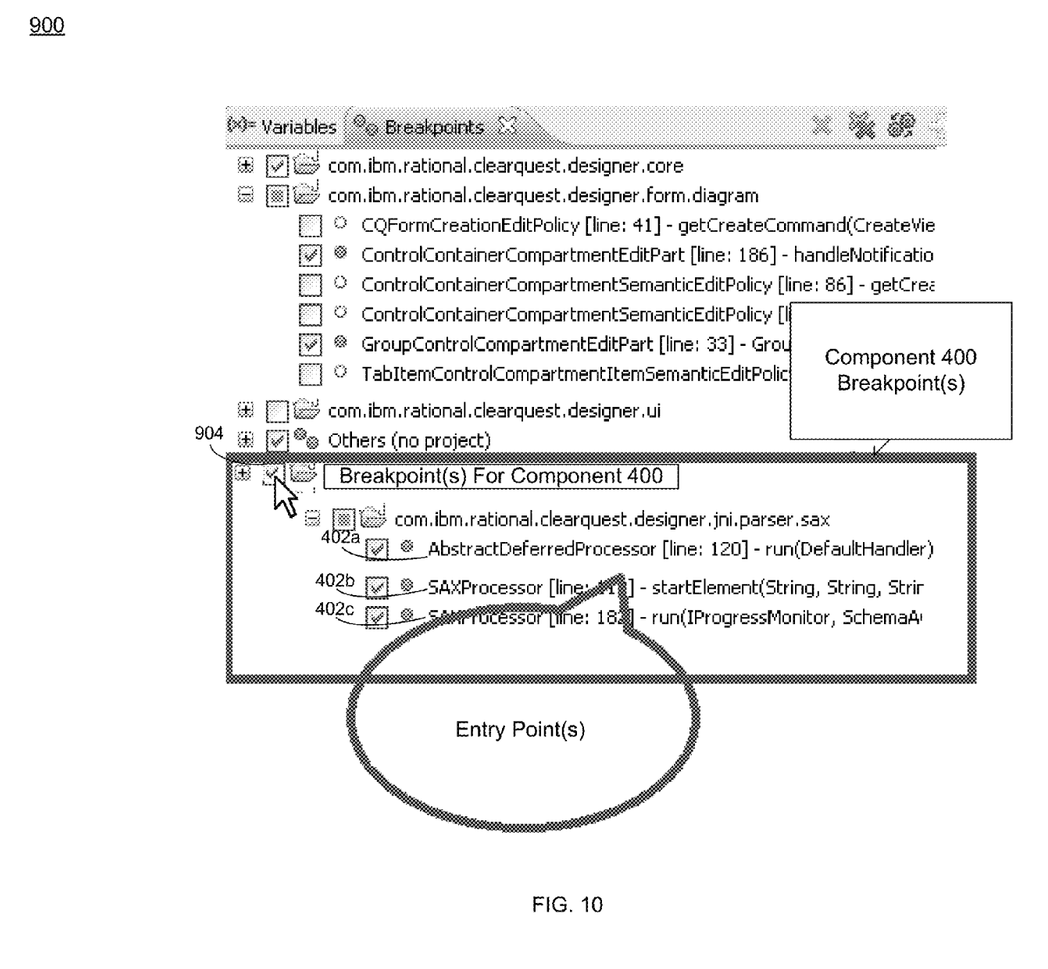
FIG. 10 is an illustrative diagrammatic view of a screen image displayed by the breakpoint process of FIG. 1 according to one or more implementations of the present disclosure.

For instance, and referring at least to FIG. 10, assume that user 46 selects object 904 to enable 318a all the above-noted component entry points, including component entry point 402d (not shown), thereby enabling 318a component 400 as whole. Just as discussed in the above example, when external program 600 (E) makes a call into component 400 and reaches line breakpoint 500 for component entry point 402a (A), i.e., line breakpoint 500 is "hit" or reached. As line breakpoint 500 for component entry point 402a (A) has been reached from outside of component 400 (e.g., via external program 600 (E)), line breakpoint 500 may be triggered by the call and breakpoint process 10 may stop 304 the program executed by the debugger. However, now assume that user 46 deselects (or does not initially select) object 904 to disable 318b all component entry points 402(a)-(d), thereby disabling 318b component 400 as whole. In the example, even though line breakpoint 500 for component entry point 402a (A) has been reached from outside of component 400 (e.g., via external program 600 (E)), line breakpoint 500 may not be triggered by the call and breakpoint process 10 may continue 306 the program executed by the debugger, since component entry point 402a (A) is from component 400, and component 400 is disabled 318b. It will be appreciated that one or more components may be enabled 318a and/or disabled 318b individually and/or simultaneously.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, and any combinations thereof will be apparent to those of ordinary skill in the art without departing from the scope and spirit of the disclosure. The implementation(s) were chosen and described in order to best explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, and combinations thereof) are possible without departing from the scope of the disclosure defined in the appended claims.

What is claimed is:

1. A computer program product residing on a non-transitory computer readable storage medium having a plurality of instructions stored thereon which, when executed by a processor, cause the processor to perform operations comprising:
    setting a breakpoint of a plurality of breakpoints for use by a debugger at an entry point of a plurality of entry points for a component of a plurality of components, wherein the breakpoint is set automatically;
    determining, while executing the debugger on the component, whether the breakpoint is reached from outside of the component by a program; and
    if the breakpoint is reached from outside of the component, stopping the program executed by the debugger, and if the breakpoint is reached from inside of the component, continuing the program executed by the debugger.

2. The computer program product of claim 1 further comprising:
determining that the debugger has left the component; and
in response, stopping the program executed by the debugger.

3. The computer program product of claim 1 further comprising at least one of enabling and disabling the plurality of breakpoints.

4. The computer program product of claim 1 further comprising at least one of enabling and disabling individual breakpoints of the plurality of breakpoints.

5. The computer program product of claim 1 further comprising marking the breakpoint as a breakpoint of the component to distinguish from a normal breakpoint.

6. The computer program product of claim 1 wherein the component includes a set of source code.

7. The computer program product of claim 1 wherein determining whether the breakpoint is reached from outside of the component includes checking a call stack.

8. A computing system including a processor and a memory configured to perform operations comprising:
setting a breakpoint of a plurality of breakpoints for use by a debugger at an entry point of a plurality of entry points for a component of a plurality of components, wherein the breakpoint is set automatically;
determining, while executing the debugger on the component, whether the breakpoint is reached from outside of the component by a program; and
if the breakpoint is reached from outside of the component, stopping the program executed by the debugger, and
if the breakpoint is reached from inside of the component, continuing the program executed by the debugger.

9. The computing system of claim 8 further comprising:
determining that the debugger has left the component; and
in response, stopping the program executed by the debugger.

10. The computing system of claim 8 further comprising at least one of enabling and disabling the plurality of breakpoints.

11. The computing system of claim 8 further comprising at least one of enabling and disabling individual breakpoints of the plurality of breakpoints.

12. The computing system of claim 8 further comprising marking the breakpoint as a breakpoint of the component to distinguish from a normal breakpoint.

13. The computing system of claim 8 wherein determining whether the breakpoint is reached from outside of the component includes checking a call stack.

* * * * *